(12) United States Patent
He

(10) Patent No.: US 9,246,897 B2
(45) Date of Patent: Jan. 26, 2016

(54) METHOD AND SYSTEM OF LOGIN AUTHENTICATION

(71) Applicant: Tencent Technology (Shenzhen) Company Limited, Shenzhen (CN)

(72) Inventor: Chang He, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 95 days.

(21) Appl. No.: 14/010,457

(22) Filed: Aug. 26, 2013

(65) Prior Publication Data

US 2014/0041005 A1    Feb. 6, 2014

Related U.S. Application Data

(63) Continuation of application No. PCT/CN2013/079413, filed on Jul. 15, 2013.

(30) Foreign Application Priority Data

Jul. 18, 2012  (CN) .......................... 2012 1 0249207

(51) Int. Cl.
*H04L 29/06* (2006.01)
*G06F 21/34* (2013.01)
*H04L 9/32* (2006.01)
*G06F 21/45* (2013.01)
*G06F 21/57* (2013.01)

(52) U.S. Cl.
CPC .............. *H04L 63/08* (2013.01); *G06F 21/34* (2013.01); *G06F 21/45* (2013.01); *G06F 21/577* (2013.01); *H04L 9/3215* (2013.01); *H04L 9/3228* (2013.01); *H04L 29/06* (2013.01); *H04L 63/0838* (2013.01); *H04L 63/0853* (2013.01)

(58) Field of Classification Search
USPC ........................................................... 726/7
See application file for complete search history.

(56) References Cited

U.S. PATENT DOCUMENTS

| 2012/0137353 | A1* | 5/2012 | Smales .............................. 726/7 |
| 2013/0139233 | A1* | 5/2013 | Maity ................................ 726/7 |
| 2013/0238745 | A1* | 9/2013 | Ramachandran et al. ..... 709/217 |

FOREIGN PATENT DOCUMENTS

| CN | 101257489 A | 9/2008 |
| CN | 101335623 A | 12/2008 |

OTHER PUBLICATIONS

Tencent Tech., ISRWO, PCT/CN2013/079413, Oct. 24, 2013, 8 pgs.

*Primary Examiner* — Brandon Hoffman
*Assistant Examiner* — Samuel Ambaye
(74) *Attorney, Agent, or Firm* — Morgan, Lewis & Bockius LLP

(57) ABSTRACT

A method and system for login authentication is disclosed. The method comprises the steps of: sending, by a first client, a first login request to a login server and receiving a mapping relationship between original characters and post-mapping characters returned by the login server according to the first login request; and sending, by a second client, a second login request to the login server according to the mapping relationship, with the second login request including post-mapping information corresponding to user information determined according to the mapping relationship. The solution in the present invention is to realize joint login by two clients, such that even if one of the clients is infected with a computer virus, no particular user information can be obtained through the infected client. Thus, the security of login authentication and the security of user information can be improved.

15 Claims, 8 Drawing Sheets

---

A first client sending a first login request to a login server and receiving a mapping relationship between original characters and post-mapping characters returned by a login server according to the first login request S101

↓

A second client sending a second login request to the login server according to the abovementioned mapping relationship, with the second login request including post-mapping information corresponding to user information determined according to the abovementioned mapping relationship S102

A first client sending a first login request to a login server and receiving a mapping relationship between original characters and post-mapping characters returned by a login server according to the first login request S101

A second client sending a second login request to the login server according to the abovementioned mapping relationship, with the second login request including post-mapping information corresponding to user information determined according to the abovementioned mapping relationship S102

Fig. 1

A login server receiving a first login request sent by a first client S201

The login server generating a mapping relationship between original characters and post-mapping characters according to the abovementioned first login request, and sending the mapping relationship to the abovementioned first client S202

The login server receiving a second login request sent by a second client, the second login request including post-mapping information S203

The login server determining user information corresponding to the abovementioned post-mapping information according to the abovementioned mapping relationship, and making a comparison of the user information with prestored user information S204

Fig. 2

METHOD AND SYSTEM OF LOGIN AUTHENTICATION

RELATED APPLICATIONS AND PRIORITY CLAIMS

This application is a continuation application of PCT Patent Application No. PCT/CN2013/079413, entitled "Method and System of Login Authentication" filed on Jul. 15, 2013, which claims priority to Chinese Patent Application No. 201210249207.3, entitled "Method of Login Authentication and System of Login Authentication" filed on Jul. 18, 2012, both of which are incorporated herein by reference in their entireties.

TECHNICAL FIELD

The present invention relates to the field of security, and in particular, to a method of login authentication and a system of login authentication.

BACKGROUND

With the rapid development of science and technology, more and more services can be provided to people. In order to effectively and securely utilize a corresponding service, a user is usually required to log onto a relevant server, and be authenticated by the server. After the user passes the authentication, normal login of the user can be realized, and the user can utilize the corresponding service. Among the current methods for login authentication, one of the methods is: receiving input of a user's a username and password through a computer used by the user; and at the same time, receiving input of an authentication code; and sending the inputted username, password, and authentication code to a service-providing system server to authenticate the user's identity. In such an application method, if the user's computer has been invaded by a virus or a Trojan program, and the virus or Trojan program performs key logging on the user's computer, when the user inputs the username, password, authentication code and so on, the username and password of the user will be acquired easily by the virus and Trojan program. Thus security cannot be assured. Even if various security means are employed to strengthen the security of the user's computer, the environment in which the user inputs the username and password is the same computer device as the virus or Trojan program. Since the viruses or Trojan programs are also upgrading all the time, theoretically, it is still possible that security means may be cracked by a virus or Trojan program at a higher technology level, and the username and password of the user be finally obtained by the virus or Trojan program, leading compromised security.

SUMMARY OF THE INVENTION

Aiming at the abovementioned problems existing in the prior art, an objective of the present invention is to provide a method for login authentication and a system for login authentication, which can effectively improve the security of login authentication and have the security of the user information about a user safeguarded.

In order to accomplish the object mentioned above, the present invention employs the technical solution as follows: A method of login authentication comprises the steps of: sending, by a first client, a first login request to a login server, and receiving a mapping relationship between original characters and post-mapping characters returned by the login server according to the first login request; and sending, by a second client, a second login request to the login server according to the mapping relationship, with the second login request including post-mapping information corresponding to user information determined according to the mapping relationship.

A method of login authentication comprises the steps of: receiving, by a login server, a first login request sent by a first client, generating the mapping relationship between original characters and post-mapping characters according to the first login request, and sending the mapping relationship to the first client; and receiving, by the login server, a second login request sent by a second client, with the second login request including post-mapping information, determining user information corresponding to the post-mapping information according to the mapping relationship, and making a comparison of the user information with pre-stored user information.

A system of login authentication comprises: a first client for sending a first login request to a login server and for receiving a mapping relationship between original characters and post-mapping characters returned by the login server according to the first login request; and a second client for sending a second login request to the login server according to the mapping relationship, with the second login request including post-mapping information corresponding to user information determined according to the mapping relationship.

A system of login authentication comprises: a login server for receiving a first login request sent by a first client, generating the mapping relationship between original characters and post-mapping characters according to the first login request, sending the mapping relationship to the first client, receiving a second login request sent by a second client, with the second login request including post-mapping information, determining user information corresponding to the post-mapping information according to the mapping relationship, and making a comparison of the user information with pre-stored user information.

According to the solution in the present invention, after a first client sends a first login request to a login server, the login server generates the mapping relationship between original characters and post-mapping characters according to the first login request, then a second client sends a second login request to the login server according to the mapping relationship and the second login request includes post-mapping information corresponding to user information determined according to the mapping relationship, and based on this method, joint login is realized through two client computers, in which the first client merely obtains the mapping relationship, and what is contained in the second client during the logging in is the post-mapping information determined according to the mapping relationship. Since it is difficult for the same virus or Trojan program to infect two independent clients at the same time, even if the computer virus infects one of the clients, still, no particular user information can be obtained. Thus, the security of login authentication is improved and the security of the user information of the user is safeguarded.

In some embodiments, a method of providing login authentication implemented by a login server includes: at a device having one or more processors and memory: receiving a first-level login request from a first client device, the first-level login request including first user login information associated with a user; and in response to the first-level login request: generating respective security enhancement information for the first-level login request; providing the security enhancement information to the first client device; and establishing a time window for authenticating the user through a second-level login process initiated by a respective client device different from the first client device, wherein the second-level login process requires the user to provide second user login information in accordance with the security enhancement information.

In some embodiments, a computer-implemented method of providing login authentication implemented by a first client device includes: at a device having one or more processors and memory: receiving, from a user, a user input for initiating a first-level login process; presenting, to the user, a request for partial login information; receiving the partial login information from the user; sending the partial login information to a login server in a first-level login request; receiving, from the login server, security enhancement information generated for the first-level login request; and presenting the received security enhancement information to the user.

In some embodiments, a computer-implemented method of providing login authentication implemented by a second device, includes: at a device having one or more processors and memory: receiving, from a user, a user input for initiating a second-level login process; presenting, to the user, a first request for complete login information associated with the user, and a second request for respective identifying information for respective security enhancement information that was provided to the user by a login server in response to a first-level login request previously sent to the login server from another device different from the device; receiving the complete login information from the user and the identifying information for the respective security enhancement information, wherein the complete login information is provided by the user in accordance with the respective security enhancement information; sending a second-level login request to the login server, the second-level login request including the complete login information provided in accordance with the respective security enhancement information and the identifying information for the respective security enhancement information; and receiving a login response from the login server indicating whether the complete login information has passed or failed a verification process based on pre-stored original login information associated with the user and the respective security enhancement information.

DESCRIPTION OF THE DRAWINGS

FIG. 1 is a flowchart of an exemplary method for login authentication in accordance with some embodiments.

FIG. 2 is a flowchart an exemplary method for login authentication in accordance with some embodiments.

DETAILED DESCRIPTIONS

Figure 3:
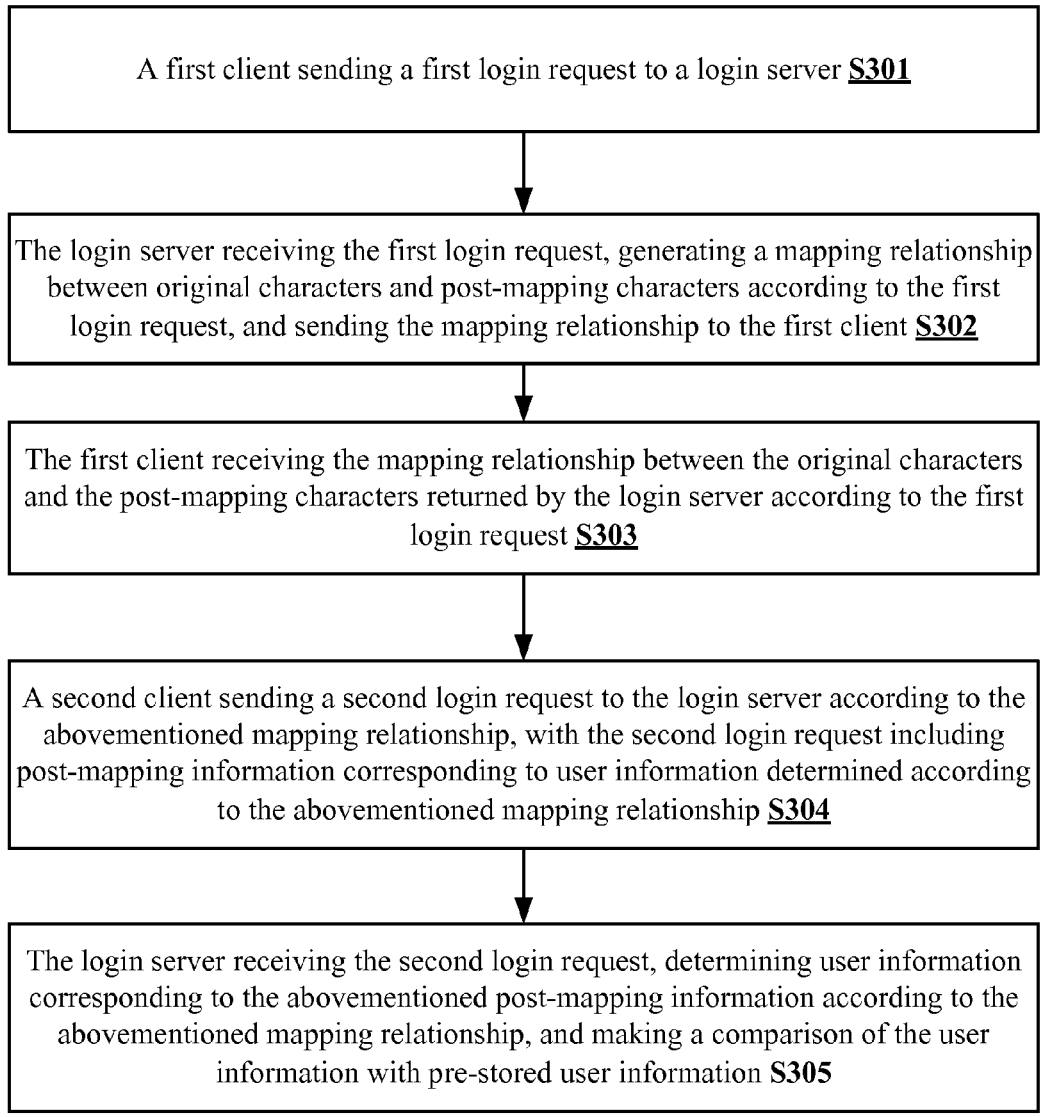
FIG. 3 is a flowchart of an exemplary method for login authentication in accordance with some embodiments.

The solution in the present invention will be described in detail hereinafter in conjunction with one or more preferred embodiments. In the following description, various embodiments of the method for login authentication in the present invention will be described first, and then embodiments of the system for login authentication in the present invention will be described.

Exemplary Embodiment I

FIG. 1 shows a flowchart of an exemplary embodiment of the method for login authentication. In this exemplary embodiment, description is made by taking the processing flow at the side of two clients as an example.

As shown in FIG. 1, the method for login authentication in this exemplary embodiment includes the steps of:

step S101: sending, by a first client, a first login request to a login server, and receiving the mapping relationship between original characters and post-mapping characters returned by the login server according to the first login request; and step S102: sending, by a second client, a second login request to the abovementioned login server according to the abovementioned mapping relationship, with the second login request including post-mapping information corresponding to user information determined according to the abovementioned mapping relationship.

According to the solution in this exemplary embodiment, a first client sends a first login request to a login server and obtains the mapping relationship between original characters and post-mapping characters generated by the login server according to the first login request, then a second client sends a second login request to the login server according to the mapping relationship and the second login request includes post-mapping information corresponding to user information determined according to the mapping relationship. Based on this login method, login is realized through the combination of two clients. Since it is difficult for the same virus or Trojan program to infect two independent clients at the same time, even if a computer virus infects one of the clients, still no particular user information can be obtained by the virus or Trojan program. Thus, the security of login authentication is improved and the security of the user information of the user is safeguarded.

In this case, when the login server generates the abovementioned mapping relationship, the mapping can be generated according to machine-based pseudo-random generator. In addition, when generating the abovementioned mapping relationship, the login server can further generate a mapping relationship serial number corresponding to the mapping relationship and send the mapping relationship serial number to the first client, while, before, or after sending the abovementioned mapping relationship to the first client. The first client receives the mapping relationship serial number returned by the login server, and when the second client sends a second login request to the login server, the second login request can further include the abovementioned mapping relationship serial number received by the first client. After receiving the second login request, the login server determines a corresponding mapping relationship according to the mapping relationship serial number in the second login request, and determines user information corresponding to the post-mapping information in the second login request according to the determined mapping relationship. The login server makes a comparison of the user information with pre-stored user information so as to authenticate whether a user of the second client is allowed for login.

In one of the particular examples, the abovementioned user information can include a user password, and accordingly, the abovementioned post-mapping information can include a post-mapping password corresponding to the user password determined on the basis of the abovementioned mapping relationship. In other words, when the second client sends the second login request, the user password can be encrypted according to the abovementioned mapping relationship.

In another particular example, the abovementioned user information can include a username, and accordingly, the abovementioned post-mapping information can include a post-mapping username corresponding to this username as determined on the basis of the abovementioned mapping relationship. In other words, when the second client sends the second login request, the username can be encrypted in accordance with the abovementioned mapping relationship.

In another particular example, the abovementioned user information can include a username and a user password at the same time, and accordingly, the abovementioned post-mapping information can include a post-mapping username and a post-mapping password corresponding to the username and the user password determined on the basis of the abovementioned mapping relationship. In other words, when the second client sends the second login request, the username and the user password can be encrypted at the same time according to the abovementioned mapping relationship.

Of course, according to different actual application requirements, the abovementioned user information can further include other types of information, and the particular types are relevant to the types of the systems applied to. For example, for logging into a student management system, the user information optionally includes information such as a student ID number, name, class, etc. For logging into an enterprise employee information management system, the user information optionally includes information such as the department, employee number, name, employment duration, etc. There may be differences according to different particular types of application systems, while redundant description will not be made here.

Exemplary Embodiment II

FIG. 2 shows a schematic flowchart of an exemplary embodiment of the method for login authentication in the present invention. In this exemplary embodiment, description is made by taking the processing flow at the side of a login server as an example.

As shown in FIG. 2, the method for login authentication in this embodiment includes the steps of:

Step S201: a login server receives a first login request sent by the first client.

Step S202: the login server generates a mapping relationship between original characters and post-mapping characters according to the abovementioned first login request and sends the mapping relationship to the abovementioned first client.

Step S203: the login server receives a second login request sent by a second client, with the second login request including post-mapping information.

Step S204: the login server determines user information corresponding to the abovementioned post-mapping information according to the abovementioned mapping relationship and makes a comparison of the user information with pre-stored user information.

In this case, when the login server generates the abovementioned mapping relationship, the mapping can be generated by a machine-based pseudo-random generator. In addition, when generating the abovementioned mapping relationship, the login server can further generate a mapping relationship serial number corresponding to the mapping relationship, and send the mapping relationship serial number to the first client while, before, or after sending the abovementioned mapping relationship. After the first client receives the mapping relationship serial number returned by the login server, and when the second client sends a second login request to the login server, the second login request can further include the abovementioned mapping relationship serial number received by the first client. After receiving the second login request, the login server determines a corresponding mapping relationship according to the mapping relationship serial number in the second login request, and determines user information corresponding to the post-mapping information in the second login request according to the determined mapping relationship. The login server then makes a comparison of the user information with pre-stored user information so as to authenticate whether a user of the second client is allowed for login.

In one of the particular examples, the abovementioned user information can include a user password, and accordingly, the abovementioned post-mapping information can include a post-mapping password corresponding to the user password determined on the basis of the abovementioned mapping relationship. In other words, when the second client sends the second login request, the user password can be encrypted according to the abovementioned mapping relationship.

In another particular example, the abovementioned user information can include a username, and accordingly, the abovementioned post-mapping information can include a post-mapping username corresponding to the username determined on the basis of the abovementioned mapping relationship. In other words, when the second client sends the second login request, the username can be encrypted merely according to the abovementioned mapping relationship.

In another particular example, the abovementioned user information can include a username and a user password at the same time, and accordingly, the abovementioned post-mapping information can include a post-mapping username and a post-mapping password corresponding to the username and the user password determined on the basis of the abovementioned mapping relationship. In other words, when the second client sends the second login request, the username and the user password can be encrypted at the same time according to the abovementioned mapping relationship.

Of course, according to different actual application requirements, the abovementioned user information can further include other types of information, and the particular types are relevant to the types of the systems applied to. For example, for logging into a student management system, the user information may include information such as a student ID number, name, class, etc. For logging into an enterprise employee information management system, the user information may include information such as the department, employee number, name, employment duration, etc., and there may be differences according to different particular types of application systems, and the redundant description of will not be made here.

Exemplary Embodiment III

FIG. 3 shows a schematic flowchart of an exemplary embodiment of the method for login authentication in the present invention. In this exemplary embodiment, description is made by taking the interaction process of two clients and a login server as an example.

As shown in FIG. 3, the method for login authentication in this embodiment includes the steps of:

Step S301: a first client sends a first login request to a login server.

Step S302: the login server receives the first login request sent by the first client, generates the mapping relationship between original characters and post-mapping characters according to the first login request, and sends the mapping relationship to the abovementioned first client.

Step S303: the first client receives the mapping relationship between the original characters and the post-mapping characters returned by the login server according to the first login request.

Step S304: a second client sends a second login request to the abovementioned login server according to the abovementioned mapping relationship, with the second login request including post-mapping information corresponding to user information determined according to the abovementioned mapping relationship.

Step S305: the login server receives the second login request sent by the second client, determines user information corresponding to the abovementioned post-mapping information according to the abovementioned mapping relationship, and makes a comparison of the user information with pre-stored user information.

In this case, when the login server generates the abovementioned mapping relationship, the mapping relationship can be generated by a machine-based pseudo-random generator. When generating the abovementioned mapping relationship, the login server can further generate a mapping relationship serial number corresponding to the mapping relationship, and send the mapping relationship serial number to the first client at the same time as sending the abovementioned mapping relationship to the first client or at a time therebefore or thereafter.

In one of the particular examples, the abovementioned mapping relationship can be embodied in the manner of a character mapping table, and accordingly, the abovementioned mapping relationship serial number can be referred to as a password table serial number, and the password table serial number and the character mapping table can form a password table together. A particular example of the password table is shown in the following table.

TABLE 1

| | Password table serial number 2012000001 | |
|---|---|---|
| Character mapping table | Original character | Post-mapping character |
| | 0 | 7 |
| | 1 | 3 |
| | 2 | 8 |
| | 3 | 2 |
| | 4 | 5 |
| | 5 | 1 |
| | 6 | 9 |
| | 7 | 4 |
| | 8 | 0 |
| | 9 | 6 |

As shown in the above table, the password table serial number is used in identifying the password table used during the current login. Generally, the same password table number will be used only once and will not be reused in other login processes. Since the password table serial number is mainly used for identifying the password table employed, the password table serial number can be generated on the basis of a running number system.

The abovementioned character mapping table is used in illustrating the mapping relationship between the original characters and the post-mapping characters. The table is a mapping table for translating an encrypted character into a corresponding real or un-encrypted character. For the sake of simple explanation, the above table uses only numbers as an example for original and post-mapping characters. When creating a character mapping table in practice, the original characters and post-mapping characters can be information of any type, including, alphabets, numerals, special symbols, Chinese characters, etc.

A character mapping table can be generated according to a machine-based pseudo-random generator. For example, in one of the methods, after having determined original characters and arranging them sequentially, the sequence order of the sequentially arranged original characters can be rearranged randomly or pseudo-randomly, and the characters in the rearranged sequence are put into one to one correspondence with the characters arranged in the original sequential order to realize the mapping relationship between the original characters and the post-mapping characters.

In another exemplary method, one copy of all the original characters is made as backup characters. An un-mapped character is selected sequentially from the original characters one by one. For each selected un-mapped character, a character is randomly selected from the unselected characters in the backup characters as the post-mapping character of the un-mapped character. For example, assuming that the original characters are labeled as "A, B, C, D . . . ", and the backup characters are labeled as "A', B', C', D' . . . " After having determined all the original characters, when selecting a certain character (such as A), a character (such as C') is selected randomly from all the backup characters to be used as the post-mapping character of character A. Then another character (such as B) is selected from the original characters, and a character (such as A') is randomly selected from all the remaining characters after removing character C' from the backup characters to be used as the post-mapping character of character B. The process continues until the mappings of all the original characters are completed. Of course, according to actual requirements, other methods can also be employed to generate a character mapping table, as long as one original character uniquely corresponds to one post-mapping character, and one post-mapping character uniquely corresponds to one original character.

Supposing that the server requires the user password in the second login request sent by the second client to be filled in with the post-mapping characters. As shown in the above table, assuming that the user password in the second login request is "7", then the user password "7" is actually an encrypted password, i.e. a post-mapping character, and the corresponding original character thereof should be "0". Assuming that the password in the second login request is "965328", then this "965328" is also an encrypted password comprising post-mapping characters, and the corresponding real password thereof should be "694132".

The following is an exemplary code segment for generating the password table number and the character mapping table in C++ language, in accordance with some embodiments.

```
#include <map>
#include <string>
#include <list>
using namespace std;
class PasswordCode
{public:
    int     m_nID;              //password table number
    map<char,char> m_mapCode;   //character mapping table
    void Init( )
    { static int nPasswordId = 0;  //used for a running number
      m_nID = nPasswordId++;       //obtaining a password table
   number, here an ascending running number is used
      //generating the character mapping table
      list<char> listSource;       //an auxiliary character extraction
```

-continued

```
list
    //preparing a password character set
    for(char i='0' ; i <= '9' ; ++i)
    {   listSource.push_back(i);
    }
    for(char j='0' ; j <= '9' ; ++j)
    { //randomly disordering the character set sequence
      if( listSource.size( ) > 1)
      { int nIndex = rand( ) % listSource.size( );
        list<char>::iterator itor = listSource.begin( );
        for( int k = 0 ; k < nIndex ;k++)
        { itor++;
        }
        m_mapCode[*itor]=j;
        listSource.erase(itor);
      }
      else
      {m_mapCode[listSource.front( )] = j;
      }
    }
    //completed, the disordered character set is stored in the data
    structure map, i.e. an m_mapCode member
    }
    string Decode(string strOld)
    { string strDecode;
      string::iterator itor;
      for(itor = strOld.begin( );itor!=strOld.end( );++itor)
      { strDecode += m_mapCode[*itor];
      }
      return strDecode;
    }
};
//method for obtaining a new password table
PasswordCode myPassword;
myPassword.Init( );
```

After the first client obtains the password table returned by the login server, the second client inputs relevant login information according to this password table and sends a second login request to the login server. This second login request includes post-mapping information determined by the abovementioned password table. In some embodiments, on an as-needed basis, this second login request can include only the corresponding post-mapping information for the particular types required by the login server. For example, in the case where the login server only requires a post-mapping password corresponding to the user password, the password included in the second login request sent to the login server is a post-mapping password corresponding to the original user password based on the abovementioned password table. For other information, such as username and so on, the information included in the second login request includes original information that is not mapped based on the abovementioned password table.

When taking security-related elements into consideration, in order to further enhance security, it can be required that the second login request sent by the second client to the login server includes, for all the user information, post-mapping information based on the abovementioned password table. For example, if the user information contains a username and a user password, the username contained in the second login request is a post-mapping username corresponding to the original username based on the abovementioned password table, and the user password contained in the second login request is a post-mapping password corresponding to the original user password based on the abovementioned password table. In the case that the second login request includes a password table serial number, the password table serial number in the second login request shall be the original password table serial number sent by the login server to the first client.

Taking the password table shown in the Table 1 as an example, assuming that the account number of a certain user is 2300223 and the password is 123456. Then, based on the mapping rules shown in Table 1, the post-mapping account number of the user account number 2300223 is 8277882, and the post-mapping password of the password 123456 is 382519.

In an exemplary embodiment in which only the user account number needs to be encrypted, when relevant user information is provided before the second login request is sent out to the login server, the user account number inputted by the user is the post-mapping account number 8277882, and the input user password is the original password 123456. At the same time, the user also inputs the password table serial number 2012000001. After having inputted such relevant information, the password table serial number contained in the second login request sent by the second client to the login server is 2012000001, the contained user account number is the post-mapping account number 8277882, and the contained user password is the original user password 123456. After the login server receives the second login request and obtains the corresponding password table according to the password table number 2012000001, the login server only needs to determine the original user account number 2300223 corresponding to the post-mapping account 8277882 based on this password table, and then make a comparison of this user account number 2300223 and user password 123456 with the account number and password stored at the login server, so as to authenticate and determine whether this user is allowed for login.

Similarly, in an exemplary embodiment in which only the user password needs to be encrypted, when relevant user information is provided before the second login request is sent out, the user account number inputted by the user is the original account number 2300223, and the input user password is the post-mapping password 382519. At the same time, the user can input the password table serial number 2012000001. After having inputted such relevant information, the password table serial number contained in the second login request sent by the second client to the login server is 2012000001, the contained user account number is the original account number 2300223, and the contained user password is the post-mapping password 382519. After the login server receives the second login request and obtains the corresponding password table according to the password table serial number 2012000001, the login server only needs to determine the original password 123456 corresponding to the post-mapping password 382519 based on this password table, and then make a comparison of this user password 123456 and user account number 2300223 with the account number and password stored at the login server, so as to authenticate and determine whether this user is allowed for login.

Similarly, in an exemplary embodiment in which both the user account number and user password need to be encrypted at the same time, when relevant user information is inputted before the second login request is sent out, the user account number inputted by the user is the post-mapping account number 8277882, and the inputted user password is the post-mapping password 382519. At the same time, the user can input the password table serial number 2012000001. After having inputted such relevant information, the password table serial number contained in the second login request sent by the second client to the login server is 2012000001, the contained user account number is the post-mapping account number 8277882, and the contained user password is the post-mapping password 382519. After the login server receives the second login request and obtains the corresponding password table according to the password table number 2012000001, it is required to determine the original account number 2300223 corresponding to the post-mapping account number 8277882 and the original password 123456 corresponding to the post-mapping password 382519 based on this password table, and then make a comparison of the user password 123456 and user account number 2300223 with the account number and password stored by itself, so as to authenticate and determine whether this user is allowed for login.

Of course, for the sake of simple explanation, the abovementioned description is described merely by taking the user account number and user password as an example. According to actual requirements in various different application systems, the contained user information can also be different. For example, for logging in a student management system, the user information may include information such as student ID number, name, class, etc. For logging in an enterprise employee information management system, the user information may include information such as department, employee number, name, employment duration, etc. There may be difference according to different particular types of application systems. As to the user information, which part of the user information should be provided to the login server in its post-mapping form can be determined based on actual requirements of the particular applications, and the redundant description of the particular implementation thereof will not be made here.

After receiving the second login request submitted by the second client, the login server finds the corresponding password table according to the password table serial number, and then performs mapping and decryption on the post-mapping account number and the post-mapping password based on the corresponding password table to obtain the original real user account number and user password. Then, it searches a database to find out whether there are records about matched user account number and user password. If yes, then it indicates that the identity of this user is valid and he/she is allowed for login; and if no, then it indicates that the current login is invalid and the login is rejected.

The following is an exemplary code segment implemented in the C++ programming language to realize the processing flow of the login server, in accordance with some embodiments.

```
map<int,PasswordCode*> mapPasswordTable;
    PasswordCode myPassword;
    myPassword.Init( );
    mapPasswordTable[myPassword.m__nID] = &myPassword;
    //the user submits the password table number (nTableId), the
encrypted account number (strName) and the encrypted password
(strPass)
    PasswordCode*  pCode  =  mapPasswordTable[nTableId];
    //obtaining a password table according to the number
    string strTrueName = pCode->Decode(strName);
    //decoding the account number
    string strTruePass = pCode->Decode(strPass);     //decoding
the password
```

By way of the abovementioned code, a decoded account number (stored in variable strTrueName) and a decoded password (stored in variable strTruePass) can be obtained.

After obtaining the decoded account number and password, whether this account number is valid can further be checked by querying the database. In some embodiments, the database SQL statement for checking whether this account number is valid can be: "string strSQL="select * from USER_INFO where name=\'"+strTrueName+"\' and password=\'"+strTruePass+"\'"".

In various embodiments, the abovementioned first client and second client can be implemented using any possible devices, such as a computer, a smart phone, a tablet PC or other intelligent terminal devices and so on. Since login is realized by combining two independent clients, and the possibility for the same virus or Trojan program to infect two machines at the same time and have these two machines associated is extremely small, the security of user login is greatly improved.

Since the first client and the second client are independent from each other, the method for the password table received by the first client to be conveyed to the second client or the method for the second client or the user using the second client to obtain the password table received by the first client can be performed in various possible manners.

One of the simplest manners is that the computers, mobile terminals and so on where the two clients are located are physically placed together, so that the user can directly see the displays of the two devices and perform an operation directly. This case is suitable for those application scenarios where a plurality of computers are available for use at the same time, such as in an office, in a school, in a home which has a plurality of computers, and so on. There are a relatively larger number of computers in these application scenarios, thus the viewing of the displayed information on adjacent computers can be realized directly. For example, the password table received by a first computer where the first client is located can be conveniently viewed by the user, when the user uses the second client in a second computer to log in, in a place where a plurality of computers can be used directly to realize a securer login.

However, as to the case that the computers where the two clients are located are not physically placed together and cannot be viewed together directly, the password table received by the first client can be sent to the user or operator who uses the second client to log in. For example, the password take can be sent by the user or an assistant of the user of the computer where the first client is located, through a telephone, a camera, an email, a multimedia message and/or other communication methods. The particular communication methods or communication types are not limited, as long as the user who uses the second client to log in can obtain this password table, so as to be able to perform mapping and encryption on the user information which is required to be mapped and encrypted according to this password table.

In addition, in another embodiment, in order to further ensure security, when generating the password table, the login server can generate a corresponding valid period for this password table, or a preset time period for using this password table; and the second client shall send to the login server the second login request containing the password table serial number of this password table within this preset time period. In other words, the login server shall receive the second login request containing the password table serial number of this password table within this preset time period. If this preset time period is exceeded, then the login server optionally removes this password table to avoid subsequent malicious use by malicious users. In some embodiments, if the login server receives the second login request containing the password table number of this password table after this preset time period is exceeded, then prompt information such as information indicating that this password table does not exist, or that the password is wrong and so on, can be returned to the second client. At the same time, prompt information about reacquiring the password can be returned to the second client.

By way of the abovementioned solution of the present invention, login is realized through the combination of two clients, which is equivalent to realizing login by combining two clients, which greatly improves security.

In an exemplary embodiment in which the terminal where the client is located is a computer, regardless of which one of the computers is infected by the Trojan program or virus, the password of the user cannot be guessed or figured out. Since only one password table is obtained when the Trojan program or virus monitors the first level login of the computer where the first client is located, and the user does not perform an input operation on the computer where the first client is located, the Trojan program or virus cannot obtain the real password. When the Trojan program or virus monitors the second level login of the computer where the second client is located, even if it can intercept the user information input by the user, this inputted user information is encrypted and disposable, which will be invalid after being used once. Without the password table, the Trojan program or virus cannot obtain the correct original password.

On the other hand, it is very difficult for the Trojan program or virus to infect at the same time two computers operated by the user. Since the infection of the Trojan program is random, it cannot control the situation for the two specific computers operated by the user to be infected at the same time just by the same Trojan program or virus. Furthermore, two computers may employ different operating systems, and it is very difficult for the Trojan program to realize the compatibility thereof and at the same time also to realize the instantaneous monitoring thereof, which requires a significant amount background computation. Therefore, it is highly unlikely for the same Trojan program or virus to infect at the same time two computers operated by the user. Generally speaking, the level of the security threshold to log in using two computers is improved greatly relative to the security threshold to log in using a single computer. If necessary, the computer where the first client is located can be used for merely acquiring the password table, other software will not be installed. In some embodiments, the first client can be denied access or log in to other irrelevant websites, so that the likelihood for it to be infected with any Trojan program or virus is greatly reduced. Thus, the security problem is less likely to occur.

In addition, since a joint login on two computers is used, accordingly, two operators can be required to log in jointly, and in the case that some special systems cannot trust any one of the operators by individually, the joint login of two operators can further improve the reliability of system security.

According to the abovementioned method for login authentication, the present invention further provides a system for login authentication, and the system for login authentication provided in the present invention can only include the abovementioned first client and second client and can also only include the abovementioned login server, and can also include the abovementioned first client, second client and login server at the same time.

Figure 4:
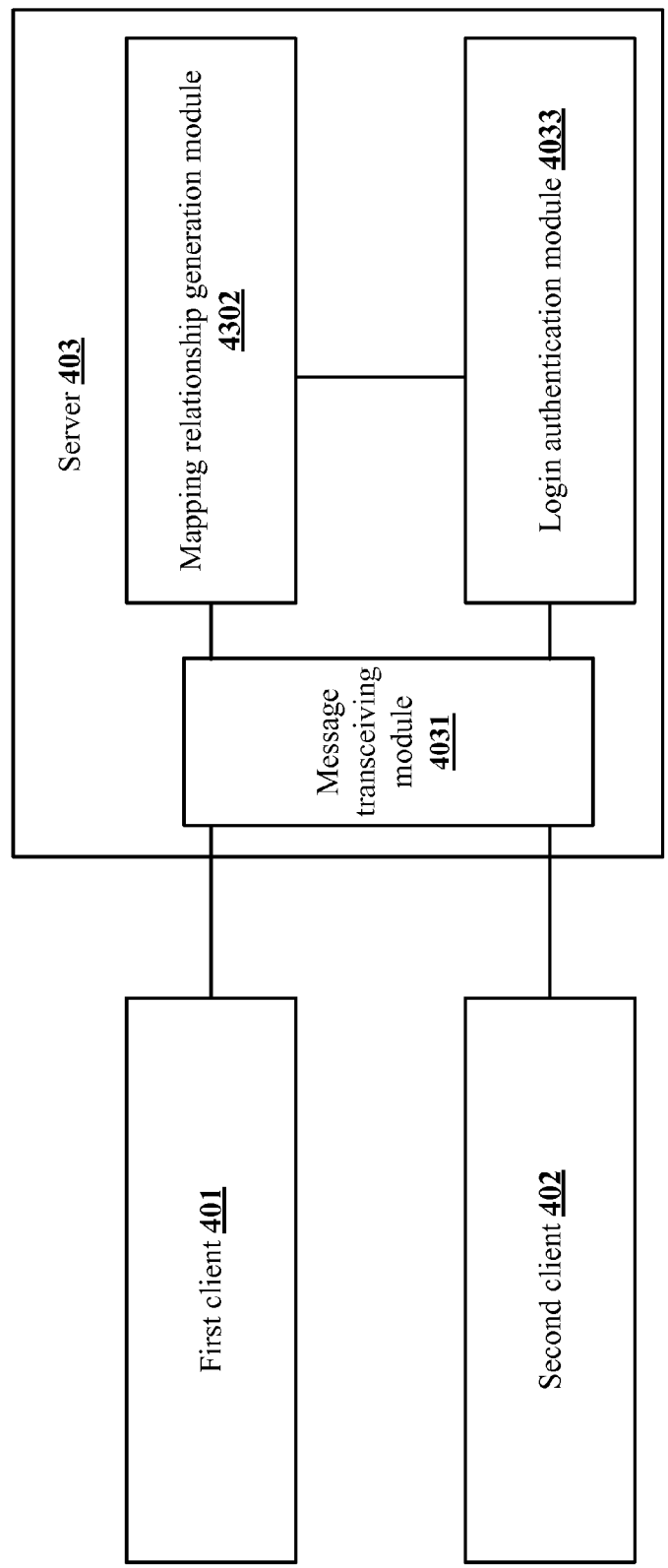
FIG. 4 is a schematic structural diagram of a system for login authentication in accordance with some embodiments.

FIG. 4 shows a schematic block diagram of an exemplary embodiment of a system for login authentication in the present invention. In this exemplary embodiment, for the sake of simple explanation, description is made by taking at the same time including a first client, a second client and a login server as an example.

As shown in FIG. 4, in this exemplary embodiment, a first client 401, a second client 402, and a login server 403 are included.

The first client 401 is used for sending a first login request to the login server 403 and receiving the mapping relationship between original characters and post-mapping characters returned by the login server 403 according to the first login request.

The second client 402 is used for sending a second login request to the login server 403 according to the abovementioned mapping relationship, with the second login request including post-mapping information corresponding to user information determined according to the abovementioned mapping relationship.

The login server 403 is used for receiving the first login request sent by the first client 401, generating the mapping relationship between the original characters and the post-mapping character according to the first login request, and sending the mapping relationship to the abovementioned first client 401, and receiving the abovementioned second login request sent by the second client 402, with the second login request including post-mapping information, determining user information corresponding to the abovementioned post-mapping information according to the abovementioned mapping relationship, and making a comparison of the user information with pre-stored user information.

As shown in FIG. 4, this login server 403 can include in particular: a message transceiving module 4031, a mapping relationship generation module 4032, and a login authentication module 4033.

The message transceiving module 4031 is configured to receive the first login request sent by the first client and the second login request sent by the second client, and send the mapping relationship generated by a mapping relationship generation module 4032 to the abovementioned first client, the abovementioned second login request comprising post-mapping information.

The mapping relationship generation module 4032 is configured to generate the mapping relationship between the original characters and the post-mapping characters according to the abovementioned first login request.

The login authentication module 4033 is configured to determine user information corresponding to the abovementioned post-mapping information according to the abovementioned mapping relationship and make a comparison of the user information with pre-stored user information.

In one of the embodiments, the abovementioned mapping relationship generation module 4032 is further configured to generate a mapping relationship serial number corresponding to the abovementioned mapping relationship according to the abovementioned first login request. The abovementioned message transceiving module 4031 is further configured to send the mapping relationship serial number to the abovementioned first client 401, and at the same time, the abovementioned second login request further comprises the mapping relationship serial number. Accordingly, the abovementioned first client 401 is further configured to receive the mapping relationship serial number corresponding to the abovementioned mapping relationship returned by the login server 403 according to the first login request, and the abovementioned second login request sent by the second client 402 further comprises the mapping relationship serial number.

In some embodiments, when the mapping relationship generation module 4032 generates the abovementioned mapping relationship, the mapping relationship can be generated using a machine-based pseudo-random generator.

Accordingly, based on the above descriptions, a login server (e.g., the login server 403 in FIG. 4) can implement an exemplary method of authenticating user login as described in FIG. 5. As described above, the login server offers a first-level login process and a second-level login process that are performed at separate times (e.g., at two different times within a given authentication time window), and with two different client devices (e.g., a first client device and a second client device). The login-server correlates the corresponding first-level login request and second-level login request based on the partial user login information (e.g., a user name provided in the first-level login request) included in the first-level login request, or a respective reference number (e.g., a respective mapping table serial number) for the security enhancement information (e.g., the respective mapping table) provided to the first client device in response to the first-level login request. Once the login server has established association between a first-level login request and a second level login request, the login sever verifies the complete login-information included in the second-level login request in accordance with the pre-stored original login information of the user and the respective security enhancement information provided to the user. In some embodiments, the login-server optionally offers both regular login authentication and the two-level login authentication. A user may invoke either the regular login or the two-level login depending on whether he or she has access to two different client devices at the same time, and whether he or she can tolerate the security risk imposed by the regular single-level login. In some embodiments, when a user initially selects the single-level login process on a client device to establish communication with the login server, the login server optionally sends back a notification educating the user about the security risks and confirms with the user whether to proceed with the single-level login in. In some embodiments, the login server optionally implements mandatory two-level login for certain types of high-sensitivity services or data, requires the user to access the services or data only through the two-level login process.

In some embodiments, as shown in FIG. 5, the login server receives (S502) a first-level login request from a first client device, the first-level login request including first user login information associated with a user. For example, the user may select an option provided on a first client device to start the first-level login process. In some embodiments, the first client device can present a webpage of the login-server, and the webpage has a link for starting a first-level login process and another link for starting a second-level login process. In some embodiments, when the user has selected the first-level login option, the login-server provides an interface (e.g., one or more input fields) on the first client device to collect first user login information from the user. In some embodiments, the first user login information are information that can be used to establish a user login session at the login server, but is not sufficient to fully authenticate the user and allow the user to gain full access to a service provided by the login server. In some embodiments, the first user login information includes only partial user login information associated with the user. In some embodiments, the partial user login information optionally includes the user's account number, or other user identifiers, but not the user's password for the user's account. In some embodiments, the first user login information includes an anonymous login ID that is randomly generated for the user by the first client device.

In some embodiments, in response to the first-level login request (S504), the login server starts the first-level login process for the user. During the first-level login process, the login server generates (S506) respective security enhancement information for the first-level login request. The login server then provides (S520) the security enhancement information to the first client device, and establishes (S522) a time window for authenticating the user through a second-level login process. As described above, the second-level login process is to be initiated by a respective client device different from the first client device, and the second-level login process requires the user to provide second user login information in accordance with the security enhancement information.

As described above, in some embodiments, to generate the enhanced security information for the received first-level login request, the login server generates (S506) a respective mapping table for converting a plurality of original characters to a plurality of post-mapping characters. For example, as shown in Table 1, if the original user login information are expressed at least in part in numerals, the mapping table includes a mapping from numeral characters (e.g., numerals 1, 2, 3) to other characters (e.g., other numerals such as 4, 5, 3; or other letters such as a, T, e; or other symbols such as §, %, *; or a mix of different types of characters such as #, 5, a). The purpose of requiring the user only to provide partial personal login information or no personal login information during the first-level login process on a first client device prevents virus or Trojan program to obtain the full personal login information of the user on the first client device. By using the mapping from original characters to post-mapping characters, the user can transcribe at least part of his or her personal login information from the original form (e.g., personal login information expressed using the original characters in the personal login information) to another form (e.g., personal login information expressed using the post-mapping characters that correspond to the original characters in the personal login information). Since the mapping is not available on the second client device, the personal login information expressed in the post-mapping characters cannot be used to decipher the original form of the personal login information. Thus, even if the second client device is also infected by a virus or Trojan program, the virus or Trojan program still cannot obtain the original personal login information of the user.

In some embodiments, when generating the respective mapping table, the login server arranges (S508) a plurality of original characters contained in the user's login information in a first randomized sequence. The login server also arranges (S510) the plurality of original characters contained in the user's login information in a second randomized sequence. Then, the login server generates (S512) a one-to-one mapping between the first and the second randomized sequences, where the characters in the first randomized sequence are used as the original characters of the respective mapping table, and the characters in the second randomized sequence are used as the post-mapping characters of the respective mapping table. For example, in Table 1, the original characters include all ten numerals, and the post-mapping characters also include all ten numerals, and the correspondence of the ten numerals in the original sequence and the ten numerals in the post-mapping sequence is generated according to a machine-based random or pseudo-random generator. Other types of characters, such as letters, symbols, Chinese characters, etc., can be included in the original sequence and the post-mapping sequence. In some embodiments, the original sequence and the post-mapping sequence can include characters or types of characters that are not used in the personal login information of the account holders. This can provide additional barrier to guessing the personal login information of the account holders. In some embodiments, for simplicity, the original sequence in the mapping table only includes characters that are actually used in the personal login information of the user, but with a randomized order. For example, if the user's original password is "3724A", the original sequence may be "273A4", while the post-mapping sequence may be "F$G2P". Based on this mapping, the user can provide his or her post-mapping password at the second client device as "G$FP2." By including only the necessary characters in the mapping, some efficiency of display space and computation power can be achieved.

In some embodiments, when generating the security enhancement information for the first-level login request, the login server further generates (S516) a respective mapping serial number for the respective mapping table. As described above, the respective mapping serial number for the respective mapping table can be stored with the respective mapping table at the login server. In addition, the respective mapping serial number is provided to the user at the first client device with the respective mapping table. When the user starts a corresponding second-level login process at a second client device, the user provides the mapping serial number to the login server, and provides her personal login information as modified according to the respective mapping table. As described above, in some embodiments, as required by the login server, all of the personal login information is optionally provided to the login server at the second client device in their post-mapping form. In some embodiments, as required by the login server, only the user name is provided in the post-mapping form, while the password is presented in its original form. In some embodiments, as required by the login server, only the password is provided in the post-mapping form, while the user name is provided in the original form.

In some embodiments, if the user has provided a user name in the original form during the first-level login process, a mapping serial number may not be necessary to correlate the first-level login request and the corresponding second-level login request. In such embodiments, the login server may optionally associates the first-level login request with its corresponding second-level login request based on the user name expressed in the original form. In some embodiments, if the user name is expressed in the original form for both the first-level and the second-level login process, the password needs to be expressed in the post-mapping form during the second-level login process to achieve the desired security enhancement.

In some embodiments, if the user has not provided a user name in the original form during the first-level login process, e.g., when the user has initiated the first-level login process using a randomly generated and anonymous user name. The login server provides the respective mapping serial number to the user at the first client device. During the second-level login process, the user provides the mapping serial number to the login server at the second client device, together with his/her personal login information expressed at least partially in the post-mapping form (e.g., with the user name and/or password expressed in the post-mapping form as instructed by the login server). The login server can associates the first login request and the second login request by matching the mapping serial number in the second-level login request received from the second client device to the mapping serial number previously provided to the first client device during the first-level login process.

In some embodiments, there is still a small likelihood that the viruses or Trojan programs residing on the first machine and the second machine may be joined by a backend server, and may jointly discover the association between the first-level login request, the mapping table, and the second level, login request. To provide even more security, in some embodiments, when generating the security enhancement information for the first-level login request, the login server generating at least part of a security enhancement information as a CAPTCHA. A CAPTCHA is a type of Turing test that can tell computers and humans apart. For example, a deformed character may be easily recognizable by a human user, but may be very difficult for a machine to recognize. For another example, whether a presented image is inverted or not may be very easy for a human user to tell, but can be very difficult for a computer to tell. There are many CAPCHAs or Turing tests that can be designed to map an original character to a post-mapping character, such that only a human user can easily determine what the mapping is, while a machine cannot determine what the mapping is even if the content (e.g., an image) that conveys the mapping is in possession of the machine. For example, if the mapping is from an original character "1" to a post-mapping character "X", the mapping relationship can be presented to the user as an image showing a skewed character "1" with an arrow pointing to a skewed character "X" in a different font or color. This image would present no problem for a human user to determine the mapping, but will severely hinder the machines' (e.g., the backend machine connecting the viruses or Trojan programs residing on the first and the second client devices) ability to decipher the mapping. In some embodiments, when the mapping is presented in a CAPTCHA form, a mapping for a smaller set of original characters (e.g., one or two characters randomly selected from the set of original characters used to express the user's original login information), rather than a set of all possible original characters can generated. In such embodiments, when the user participates in the second-level login process, the user only needs to provide a portion of the original login information (e.g., one or two characters of the user name and password) in the post-mapping form. In such embodiments, the login server stores the mapping in a non-CAPTCHA form, and can easily determine if the post-mapping user login information is the correct user login information.

In some embodiments, as described above, the first-level login request includes incomplete login information associated with the user. This way, the complete personal login information is not exposed to the virus and Trojan program that may reside on the first client device. In some embodiments, the second user login information comprises complete user login information modified in accordance with the security enhancement information. This way, even if the second client device is infected with a virus or Trojan program, without knowledge of the content of the security enhancement information (e.g., the mapping table and/or the mapping serial number), the virus or Trojan program still cannot decipher the user's original personal login information from the complete login information as modified in accordance with the security enhancement information. In addition, the virus or Trojan program cannot reuse the complete login information as modified in accordance with the security enhancement information in the future to gain access to the user's account or the login-server's service. In some embodiments, the login interface dynamically determines whether all login information is to be provided in post-mapping characters or only part of the login information should be provided in post-mapping characters during the subsequent second-level login process.

In some embodiments, the login server dynamically the form of the complete login information to be used for the second-level login request. In some embodiments, the login server dynamically determines which part (e.g., user name only, or password only, or only particular characters of the user name or password) of the login information is to be provided in post-mapping characters during the subsequent second-level login process. In some embodiments, the login server provides instruction regarding the dynamically determined format for the login information to be used in the second-level login process along with the other security enhancement information to the first client device. In such embodiments, the login server stores the format information with the enhanced security information generated for the first-level login request. In addition, in such embodiments, the first client device displays the instruction to the user. In some embodiments, the login server sends the instruction to the user at the second client device, after the second client device has provided the mapping serial number to the login server at the second client device. In such embodiments, after the instruction has been displayed to the user at the second client device, the user can provide the complete login information inaccordance with the instruction.

In some embodiments, as described above, the login server establishes a time window during which the authentication can be performed based on the second-level login request corresponding to the first-level login request. In some embodiments, the time window can be a 10 minutes time window that is started when the respective security enhancement information is provided to the user at the first client device. In some embodiments, the login server stores the start time and end time of the time window with the respective security enhancement information (e.g., the mapping table) and the respective mapping serial number (e.g., the mapping table serial number) in a database (e.g., a mapping table database). In some embodiments, if no corresponding second-level login request is received from a second client device, the login server discards the stored mapping table, and other information (e.g., the time information and the serial number information) associated with the mapping table. In some embodiments, if the login server receives a second-level login request from the same first client device, the login server optionally provides a notification to the user requesting the user to find a different client device to perform the corresponding second-level login process. In some embodiments, if the login server does allow regular single-level login as well, the login server optionally warns the user of the security risk associated with regular single-level login, and confirms with the user whether he or she wishes to proceed with a single-level login process instead. In some embodiments, if the user confirms that he or she wishes to perform the single-level login despite the security risk (e.g., when no other client machines are available nearby), the login server discards the stored mapping table and other associated information, and proceeds with a regular login process.

In some embodiments, as described above, during the time window for authenticating the user through the second-level login process, the login server receives (S524) a second-level login request from a second client device, the second-level login request including complete login information provided by the user at the second client device, and respective identifying information for the security enhancement information. For example, in some embodiments, the user provides a user name and a password, and at least one of the user name or password, or at least some characters in the user name and/or password has been modified according to the mapping table received at the first client device. In some embodiments, as described above, the identifying information for the security enhancement information is the user name in its original form. In some embodiments, the identifying information for the security enhancement information is the mapping serial number received by the user at the first client device. In some embodiments, the second device displays two options, one option is for initiating a first-level login process, and the second option is for initiating a second-level login process. In some embodiments, the second client device displays a webpage provided by the login server that offers the two options. In some embodiments, the user selects the option to invoke the second-level login process, and in response, a user interface is displayed on the second client device requesting the complete login information as modified in accordance with the security enhancement information, and the identifying information for the security enhancement information.

In some embodiments, the login server retrieves (S526) the security enhancement information based on the respective identifying information included in the second-level login request received from the second client device. For example, based on the mapping serial number, the login server can retrieve the respective mapping table associated with the first-level login request corresponding to the currently received second-level login request. In some embodiments, once the correct mapping table has been identified, the login server also verifies that the second-level login request was received within the time window associated with the first-level login request and the mapping table.

In some embodiments, the login server verifies (S528) the complete login information included in the second login request based on pre-stored original login information associated with the user and the retrieved security enhancement information. For example, in some embodiments, the login server restores the original complete personal login information from the complete login information (e.g., user name and password) included in the second-level login request, based on the character correspondence specified in the retrieved mapping table. If the restored complete login information matches the original login information associated with the user (which is stored at the login server in a user login information database), the login server determines that the second-level login request has passed the verification. If the restored complete login information does not match the original login information associated with the user, the login server determines that the second-level login request has failed the verification. In some embodiments, the login server allows (S530) the user access to a respective service in accordance with the second login request passing the verification. In some embodiments, the login server denies (S532) the user access to the respective service in accordance with the second login request failing the verification.

Figure 5A:
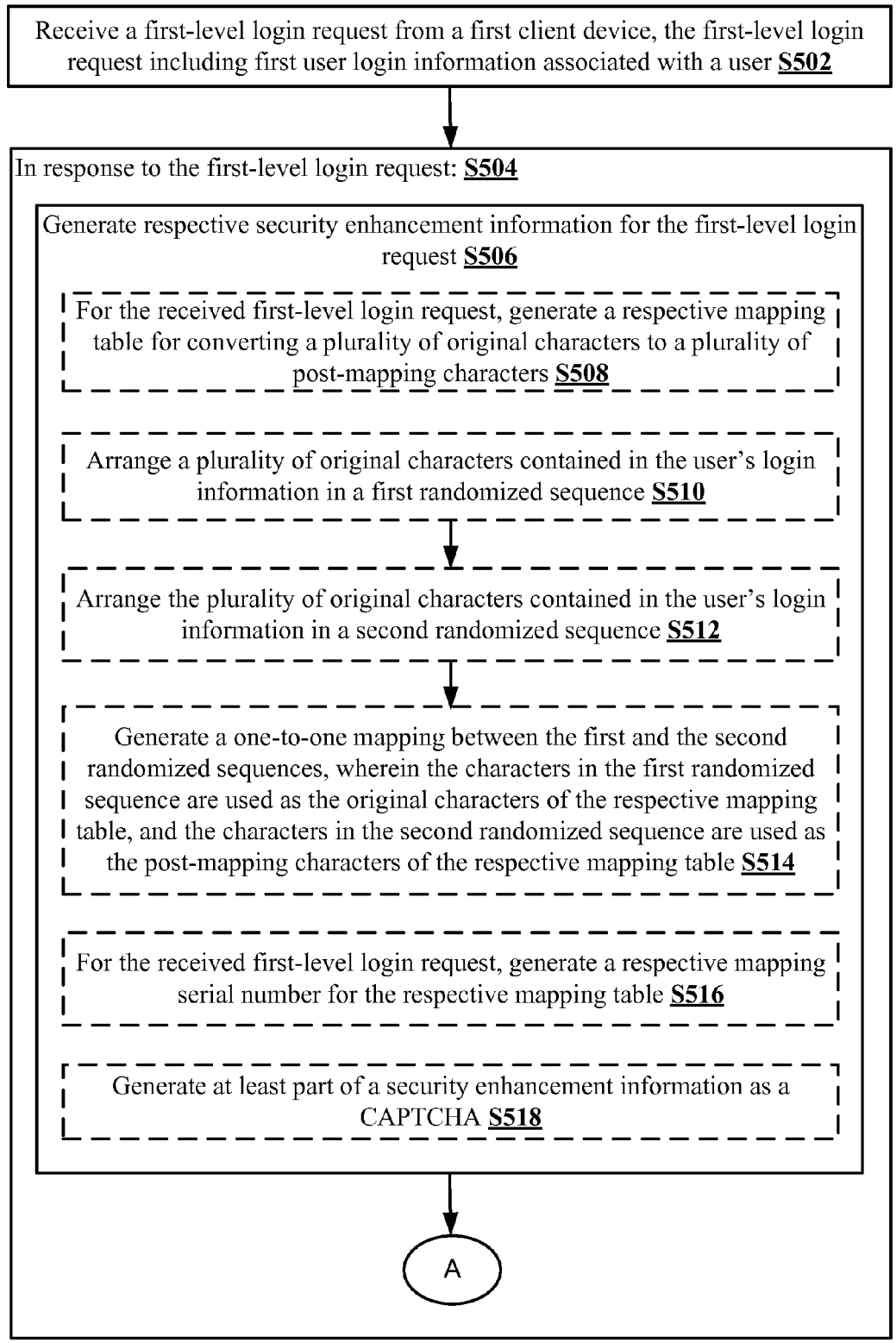
FIGS. 5A-5B is a flow chart of an exemplary method for login authentication in accordance with some embodiments.
Figure 5B:
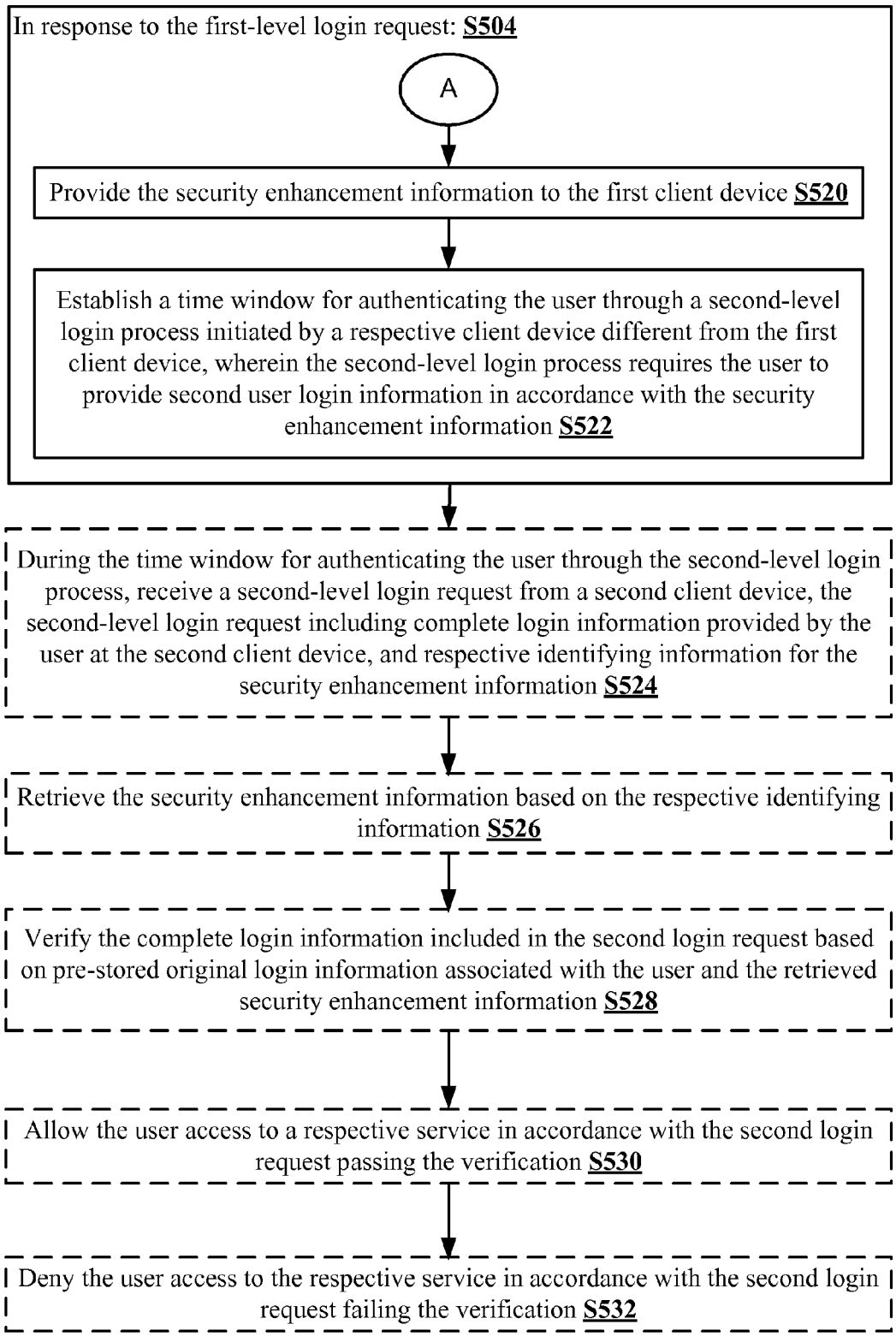

FIGS. 5A-5B are merely illustrative of the processes performed by the login server. Other details and variations are provided with respective to FIGS. 1-4, and accompanying descriptions.

Figure 6A:
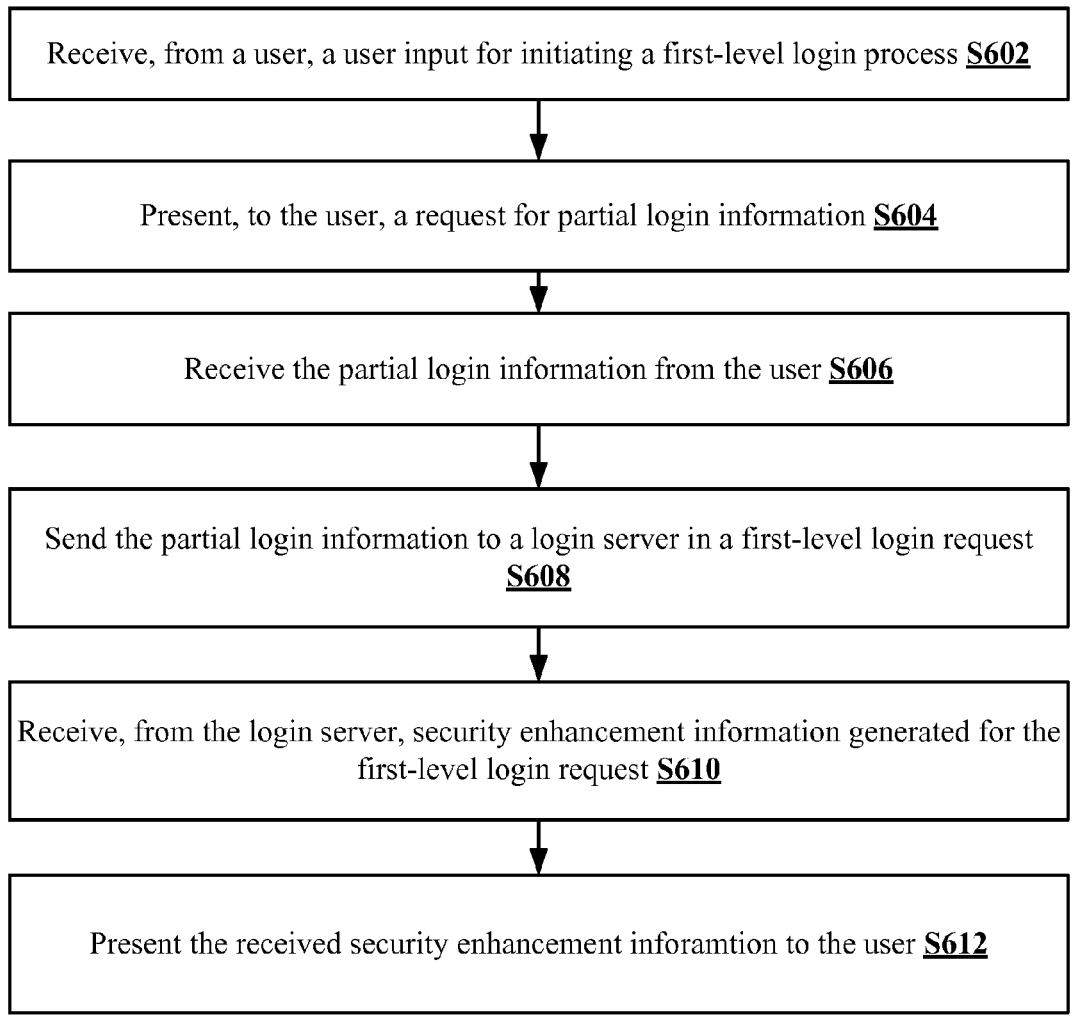
FIG. 6A is a flow chart of an exemplary method for login authentication in accordance with some embodiments.
Figure 6B:
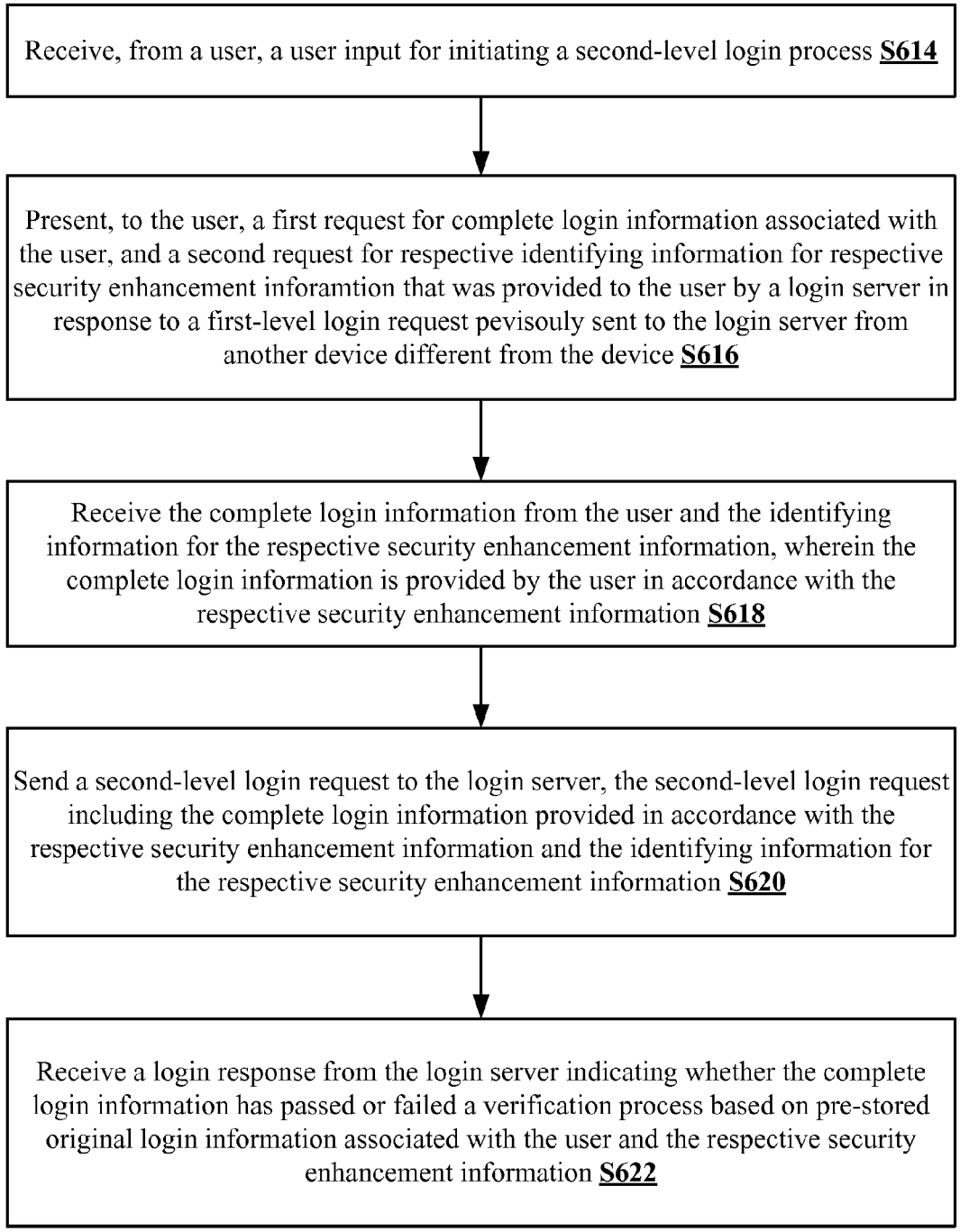
FIG. 6B is a flow chart of an exemplary method for login authentication in accordance with some embodiments.

In addition, although the actions of the first client device and the second client device are not referred to in the Figures above, a person skilled in the art would recognize the steps that the first client device and the second client device each would perform during the interaction with the user, and the login server. For illustrative purpose, FIGS. 6A and 6B provide exemplary processes that are performed by a first client device and a second client device. In some embodiments, a particular client device can serve as the first client device for one user and serve as the second client device for a different user. In addition, the particular client device can also serve as the first client device for a user one time, and serve as the second client device for the same user at a different time (e.g., outside of the authentication time window established for the previous time).

In some embodiments, FIG. 6A illustrates an exemplary process implemented by a first client device at which a first-level login process is performed.

As shown in FIG. 6A, the first client device receives (S602), from a user, a user input for initiating a first-level login process. For example, the user input is a selection input directed to a link or user interface element for invoking the first-level login process provided on a webpage of the login server currently presented on the first client device.

In some embodiments, the first client device presents (S604), to the user, a request for partial login information. For example, in a user interface, the first client device optionally provides a text input field requesting only the username from the user. For another example, the first client device optionally provides an option to perform the first-level using an anonymous user name randomly generated by the login server or the first client device.

In some embodiments, the user provides the requested partial login information, and the first client device (S606) receives the partial login information from the user. In some embodiments, once the first client device has received the partial login information, the first client device sends (S608) the partial login information to a login server in a first-level login request. In some embodiments, the first client device receives (S610), from the login server, security enhancement information generated for the first-level login request. As described above, the security enhancement information received from the login server can take on different forms, and includes different pieces of information, in accordance with various embodiments. In some embodiments, the first client device displays instructions to the user regarding how to proceed with the second-level login process on a different client device. In some embodiments, the first client device presents (S612) the received security enhancement information to the user, e.g., as a character mapping table, or a character mapping information in a CAPTCHA form. More details of the actions of the first client device have been provided above, and not repeated here with respect to FIG. 6A.

In some embodiments, FIG. 6B illustrates an exemplary process implemented by a second client device at which a second-level login process is performed.

As shown in FIG. 6B, the second client device receives (S614), from a user, a user input for initiating a second-level login process. The second client device presents (S616), to the user, a first request for complete login information associated with the user and a second request for respective identifying information for respective security enhancement information that was provided to the user by a login server in response to a first-level login request previously sent to the login server from another device different from the device. For example, in some embodiments, the second client device displays a login interface that shows a user name input field, a password input field, and a mapping table serial number input field. In some embodiments, the login interface also provides an instruction regarding which part of the complete login information should be provided with post-mapping characters. In some embodiments, the login server dynamically determines the format of the complete login information, and provides instruction to the user through the second client device.

In some embodiments, the second client device receives (S620) the complete login information from the user and the identifying information for the respective security enhancement information, where the complete login information is provided by the user in accordance with the respective security enhancement information, and optionally the instruction from the login server, if available.

In some embodiments, after the user has provided the required information to the second client device, the second client device sends (S620) a second-level login request to the login server, where the second-level login request includes the complete login information provided in accordance with the respective security enhancement information and the identifying information for the respective security enhancement information.

In some embodiments, after the required information has been sent to the login server, the second client device receives (S622) a login response from the login server indicating whether the complete login information has passed or failed a verification process based on pre-stored original login information associated with the user and the respective security enhancement information. More details of the actions of the first client device have been provided above, and not repeated here with respect to FIG. 6B.

Figure 7:
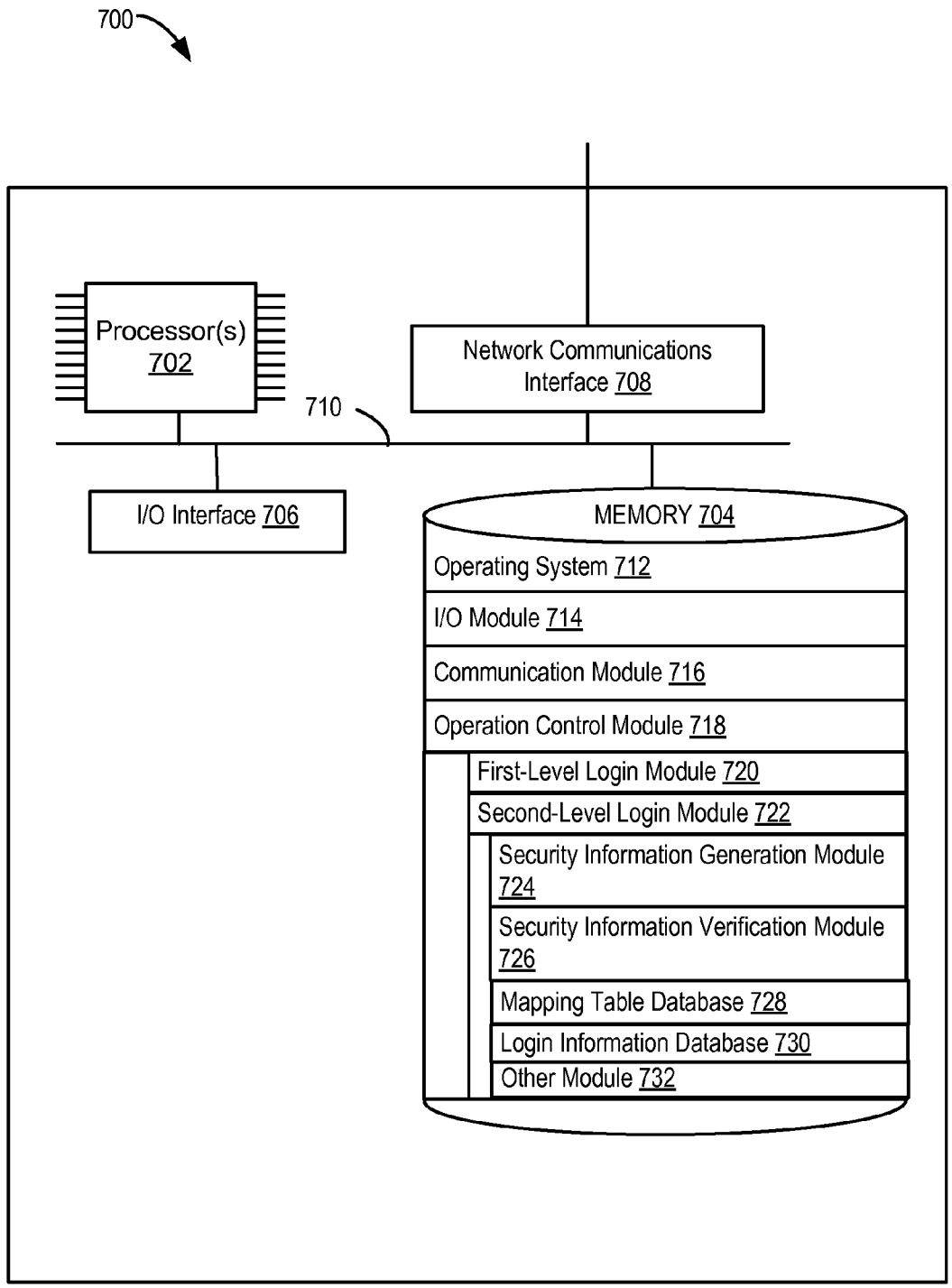
FIG. 7 is a block diagram of a system for implementing the method of login authentication in accordance with some embodiments.

FIG. 7 is a block diagram of a system 700 that can serve as a log server as described above, in accordance with some embodiments.

As shown in FIG. 7, the system 700 includes one or more processing units (or "processors") 702, memory 704, an input/output (I/O) interface 706, and a network communications interface 708. These components communicate with one another over one or more communication buses or signal lines 710. In some embodiments, the memory 704, or the computer readable storage media of memory 704, stores programs, modules, instructions, and data structures including all or a subset of: an operating system 712, an I/O module 714, a communication module 716, and an operation control module 718. The one or more processors 702 are coupled to the memory 704 and operable to execute these programs, modules, and instructions, and reads/writes from/to the data structures.

In some embodiments, the processing units 702 include one or more microprocessors, such as a single core or multi-core microprocessor. In some embodiments, the processing units 702 include one or more general purpose processors. In some embodiments, the processing units 702 include one or more special purpose processors. In some embodiments, the processing units 702 include one or more personal computers, mobile devices, handheld computers, tablet computers, or one of a wide variety of hardware platforms that contain one or more processing units and run on various operating systems.

In some embodiments, the memory 704 includes high-speed random access memory, such as DRAM, SRAM, DDR RAM or other random access solid state memory devices. In some embodiments the memory 204 includes non-volatile memory, such as one or more magnetic disk storage devices, optical disk storage devices, flash memory devices, or other non-volatile solid state storage devices. In some embodiments, the memory 704 includes one or more storage devices remotely located from the processing units 702. The memory 704, or alternately the non-volatile memory device(s) within the memory 704, comprises a computer readable storage medium.

In some embodiments, the I/O interface 706 couples input/output devices, such as displays, a keyboards, touch screens, speakers, and microphones, to the I/O module 714 of the system 700. The I/O interface 706, in conjunction with the I/O module 714, receive user inputs (e.g., voice input, keyboard inputs, touch inputs, etc.) and process them accordingly. The I/O interface 706 and the user interface module 714 also present outputs (e.g., sounds, images, text, etc.) to the user according to various program instructions implemented on the system 700.

In some embodiments, the network communications interface 708 includes wired communication port(s) and/or wireless transmission and reception circuitry. The wired communication port(s) receive and send communication signals via one or more wired interfaces, e.g., Ethernet, Universal Serial Bus (USB), FIREWIRE, etc. The wireless circuitry receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, WiMAX, or any other suitable communication protocol. The network communications interface 708 enables communication between the system 700 with networks, such as the Internet, an intranet and/or a wireless network, such as a cellular telephone network, a wireless local area network (LAN) and/or a metropolitan area network (MAN), and other devices. The communications module 716 facilitates communications between the system 700 and other devices (e.g., the first client device and the second client device) over the network communications interface 708.

In some embodiments, the operating system 702 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

In some embodiments, the system 700 is implemented on a standalone computer system. In some embodiments, the system 700 is distributed across multiple computers. In some embodiments, some of the modules and functions of the system 700 are divided into a server portion and a client portion, where the client portion resides on a user device (e.g., the first client device and the second client device) and communicates with the server portion residing one a server device through one or more networks. It should be noted that the system 700 is only one example of the operation server system, and that the system 700 may have more or fewer components than shown, may combine two or more components, or may have a different configuration or arrangement of the components. The various components shown in FIG. 7 may be implemented in hardware, software, firmware, including one or more signal processing and/or application specific integrated circuits, or a combination of thereof.

As shown in FIG. 7, the system 700 stores the operation control module 718 in the memory 704. In some embodiments, the operation control module 718 further includes the followings sub-modules, or a subset or superset thereof: a first-level login module 720, and a second-level login module 722. In some embodiments, the first-level login module 720 further includes a security information generation module 724. In some embodiments, the second-level login module 722 further includes a security information verification module 726. In addition, each of these sub-modules has access to one or more of the following data structures and data sources of the operation control module 218, or a subset or superset thereof: a mapping table database 728 containing the mapping tables generated for each first-level login request whose authentication window that has not expired, and a login information database 730 containing the original forms of personal login information associated with various users. In some embodiments, the operation control module optionally include one or more other modules 732 (e.g., a login-level selection module) to provide other related functionalities described herein. More details on the structures, functions, and interactions of the sub-modules and data structures of the operation control module 718 are provided with respect to FIGS. 1-6B, and accompanying descriptions.

As a person skilled in the art would recognize, the first client device and the second client device can be implemented as part (e.g., the client portions) of the exemplary system 700. In some embodiments, systems analogous to the exemplary system 700 can be used to implement the first client device and the second client device. Corresponding modules and functions of the client devices can be provided in the operation control module 718 of the systems that serve as the client devices.

The particular implementation methods of various modules and so on in the system for login authentication in the present invention, such as the method for generating the mapping relationship, the method for generating the mapping relationship serial number and the content particularly contained in the user information and so on, can be the same as those in the abovementioned method for login authentication in the present invention, and the redundant description thereof will not be made here.

The above-mentioned embodiments only describe several implementation methods of the present invention. The description thereof is relatively specific and detailed, but it could not be understood as restrictions to the patent scope of the present invention. It should be noted that for those skilled in the art, several transformations and improvements can further be made without departing from the concept of the present invention, and these all belong to the scope of protection of the present invention. Therefore, the scope of protection of the present invention patent should be based on the appended claims.

What is claimed is:

1. A computer-implemented method of providing two-level joint login authentication, comprising:
   at a device having one or more processors and memory:
      receiving a first-level login request from a first client device, the first-level login request including first user login information associated with a user;
      in response to the first-level login request:
         generating respective security enhancement information for the first-level login request;
         providing the security enhancement information to the first client device; and
         establishing a time window for authenticating the user through a second-level login process initiated by a respective client device different from the first client device, wherein the second-level login process requires the user to provide second user login information in accordance with the security enhancement information that has been generated and provided to the first client device in response to the first-level login request received from the first client device, and wherein the device establishes a single login session based on the first-level login request received from the first client device and the second user login information received from the respective client device different from the first client device;
      during the time window for authenticating the user through the second-level login process, receiving a second-level login request from a second client device, the second-level login request including complete login information provided by the user at the second client device, and respective identifying information for the security enhancement information;
      retrieving the security enhancement information based on the respective identifying information; and
      verifying the complete login information included in the second login request based on pre-stored original login information associated with the user and the retrieved security enhancement information.

2. The method of claim 1, wherein generating the security enhancement information for the first-level login request further comprises:
for the received first-level login request, generating a respective mapping table for converting a plurality of original characters to a plurality of post-mapping characters.

3. The method of claim 2, wherein generating the security enhancement information for the first-level login request further comprises:
for the received first-level login request, generating a respective mapping serial number for the respective mapping table.

4. The method of claim 1, wherein the first-level login request includes incomplete login information associated with the user.

5. The method of claim 1, wherein the second user login information comprises complete user login information modified in accordance with the security enhancement information.

6. A non-transitory computer-readable medium having instructions stored thereon, the instructions, when executed by one or more processors, cause the processors to perform operations comprising:
receiving a first-level login request from a first client device, the first-level login request including first user login information associated with a user;
in response to the first-level login request:
generating respective security enhancement information for the first-level login request;
providing the security enhancement information to the first client device; and
establishing a time window for authenticating the user through a second-level login process initiated by a respective client device different from the first client device, wherein the second-level login process requires the user to provide second user login information in accordance with the security enhancement information that has been generated and provided to the first client device in response to the first-level login request received from the first client device, and wherein the device establishes a single login session based on the first-level login request received from the first client device and the second user login information received from the respective client device different from the first client device;
during the time window for authentication the user through the second-level login process, receiving a second-level login request from a second client device, the second-level login request including complete login information provided by the use at the second client device, and respective identifying information for the security enhancement information;
retrieving the security enhancement information based on the respective identifying information; and
verifying the complete login information included in the second login request based on pre-stored original login information associated with the user and the retrieved security enhancement information.

7. The computer-readable medium of claim 6, wherein generating the security enhancement information for the first-level login request further comprises:
for the received first-level login request, generating a respective mapping table for converting a plurality of original characters to a plurality of post-mapping characters.

8. The computer-readable medium of claim 7, wherein generating the security enhancement information for the first-level login request further comprises:
for the received first-level login request, generating a respective mapping serial number for the respective mapping table.

9. The computer-readable medium of claim 6, wherein the first-level login request includes incomplete login information associated with the user.

10. The computer-readable medium of claim 6, wherein the second user login information comprises complete user login information modified in accordance with the security enhancement information.

11. A system, comprising:
one or more processors; and
memory having instructions stored thereon, the instructions, when executed by the one or more processors, cause the processors to perform operations comprising:
receiving a first-level login request from a first client device, the first-level login request including first user login information associated with a user;
in response to the first-level login request:
generating respective security enhancement information for the first-level login request;
providing the security enhancement information to the first client device; and
establishing a time window for authenticating the user through a second-level login process initiated by a respective client device different from the first client device, wherein the second-level login process requires the user to provide second user login information in accordance with the security enhancement information that has been generated and provided to the first client device in response to the first-level login request received from the first client device and wherein the device establishes a single login session based on the first-level login request received from the first client device and the second user login information received from the respective client device different from the first client device;
during the time window for authentication the user through the second-level login process, receiving a second-level login request from a second client device, the second-level login request including complete login information provided by the use at the second client device, and respective identifying information for the security enhancement information;
retrieving the security enhancement information based on the respective identifying information; and
verifying the complete login information included in the second login request based on pre-stored original login information associated with the user and the retrieved security enhancement information.

12. The system of claim 11, wherein generating the security enhancement information for the first-level login request further comprises:
for the received first-level login request, generating a respective mapping table for converting a plurality of original characters to a plurality of post-mapping characters.

13. The system of claim 12, wherein generating the security enhancement information for the first-level login request further comprises:
  for the received first-level login request, generating a respective mapping serial number for the respective mapping table.

14. The system of claim 11, wherein the first-level login request includes incomplete login information associated with the user.

15. The system of claim 11, wherein the second user login information comprises complete user login information modified in accordance with the security enhancement information.

\* \* \* \* \*